United States Patent
Kim et al.

(10) Patent No.: US 9,849,769 B2
(45) Date of Patent: Dec. 26, 2017

(54) STRUCTURE FOR MOUNTING BATTERY AND SPARE TIRE

(71) Applicants: Hyundai Motor Company, Seoul (KR); Kia Motors Corporation, Seoul (KR)

(72) Inventors: Joo-Nam Kim, Yongin-si (KR); Ji-Ho Choi, Hwaseong-si (KR); Dong-Wook Kim, Gwangmyeong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/204,399

(22) Filed: Jul. 7, 2016

(65) Prior Publication Data
US 2017/0210217 A1    Jul. 27, 2017

(30) Foreign Application Priority Data
Jan. 26, 2016  (KR) .......................... 10-2016-0009331

(51) Int. Cl.
*B60K 1/04* (2006.01)
*B62D 43/10* (2006.01)

(52) U.S. Cl.
CPC .............. *B60K 1/04* (2013.01); *B62D 43/10* (2013.01); *B60K 2001/0416* (2013.01); *B60K 2001/0438* (2013.01); *B60Y 2304/01* (2013.01); *B60Y 2306/01* (2013.01)

(58) Field of Classification Search
CPC .............. B60K 1/04; B60K 2001/0416; B60K 2001/0438; B60K 1/00; B62D 43/10; B60Y 2304/01; B60Y 2306/01; H01M 2/1072; H01M 2/1077; H01M 2/1083; B60L 11/1877
USPC ......................................... 180/68.5; 209/703
See application file for complete search history.

(56) References Cited

U.S. PATENT DOCUMENTS

| | | | |
|---|---|---|---|
| 6,793,261 B2 * | 9/2004 | McLeod | B29C 70/467 224/42.12 |
| 6,854,543 B2 * | 2/2005 | Rowley | B60R 16/04 180/68.5 |
| 8,469,430 B2 * | 6/2013 | Urano | B62D 43/08 224/42.12 |
| 8,708,080 B2 * | 4/2014 | Lee | H01M 2/1077 180/65.1 |

(Continued)

FOREIGN PATENT DOCUMENTS

| | | |
|---|---|---|
| CN | 102858571 B | 7/2015 |
| JP | 2005-93299 A | 4/2005 |

(Continued)

*Primary Examiner* — James A Shriver, II
*Assistant Examiner* — Brian L Cassidy
(74) *Attorney, Agent, or Firm* — Morgan, Lewis & Bockius LLP

(57) ABSTRACT

A structure for mounting a battery and a spare tire may include a battery bracket fixing the battery to an accommodating compartment recessed in a rear floor of a vehicle, and a tire mounting bracket fastened to the spare tire, disposed at an upper side of the battery, through a tire bolt, and fixing the spare tire to the rear floor, in which the battery bracket and the tire mounting bracket are separated so that a load applied to the spare tire is not transmitted to the battery.

6 Claims, 7 Drawing Sheets

(56) References Cited

U.S. PATENT DOCUMENTS

| | | | |
|---|---|---|---|
| 8,978,804 B2* | 3/2015 | Okada | H01M 2/1072 180/68.5 |
| 8,991,535 B2* | 3/2015 | Grishashvili | B60K 1/04 180/68.5 |
| 9,579,962 B2* | 2/2017 | Kobukata | B60K 1/04 |
| 2011/0011654 A1 | 1/2011 | Kubota et al. | |

FOREIGN PATENT DOCUMENTS

| | | |
|---|---|---|
| JP | 2010-13055 A | 1/2010 |
| JP | 2010-158976 A | 7/2010 |
| JP | 2013-35358 A | 2/2013 |
| JP | 2015-224009 A | 12/2015 |

* cited by examiner

STRUCTURE FOR MOUNTING BATTERY AND SPARE TIRE

CROSS-REFERENCE TO RELATED APPLICATIONS

The present application claims priority to Korean Patent Application No. 10-2016-0009331, filed Jan. 26, 2016, the entire contents of which is incorporated herein for all purposes by this reference.

BACKGROUND OF THE INVENTION

Field of the Invention

The present invention relates to a structure for mounting a battery and a spare tire for a vehicle, and more particularly, to a structure for mounting a battery and a spare tire, in which the battery and the spare tire are mounted to be completely separated from each other, and as a result, a load applied to the spare tire is not transmitted to the battery, and it is possible to restrict a position in a left and right direction of the battery when the battery is inserted.

Description of Related Art

In general, to prepare for a situation in which a tire is punctured or damaged due to an unexpected accident when a vehicle travels, and thus the vehicle cannot continue to travel any more, an extra spare tire, which may replace the damaged tire, is provided in the vehicle. The spare tire is typically stored in a separate accommodating compartment formed in a trunk room of the vehicle.

As illustrated in FIG. 1, a typical structure for mounting a spare tire and a battery in the related art has a structure in which a spare tire 3 and a battery 2 are disposed in a left and right direction on a rear floor 1 disposed at the rear side of the vehicle. In this case, the spare tire 3 is coupled to the rear floor 1 by means of a tire bolt 3a, the battery 2 is coupled to the rear floor 1 by means of a battery bracket 2a, and the spare tire 3 and the battery 2 are disposed between a pair of side members 4. However, in the case of the structure for mounting a battery and a spare tire in the related art, because the battery 2 is placed by a machine at an inaccurate position without a separate position restriction during a process of mounting the battery 2, the battery 2 needs to be moved forward or rightward by a worker, and in this process, there are problems in that the number of working processes and assembling time are increased.

A mounting structure in which the battery 2 and the spare tire 3 are installed in an up and down direction as illustrated in FIG. 2 in order to solve the above problem has an advantage in that the battery 2 and the spare tire 3 may be disposed regardless of a span, but has a drawback in that it is still difficult to restrict a position of the battery 2, and thus the battery needs to be moved directly by the worker. In the case of the structure in which the battery 2 and the spare tire 3 are mounted in the up and down direction, the battery 2 is fixed by the battery bracket 2a and the spare tire 3 is fixed to the battery bracket 2a by means of the tire bolt 3a as illustrated in FIG. 2, but there is a problem in that this structure increases a likelihood that the battery will be separated at the time of a rear-end collision of the vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a structure for mounting a battery and a spare tire, in which the battery and the spare tire are mounted by a battery bracket and a tire mounting bracket, respectively, which are installed to be spaced apart from each other, and as a result, it is possible to cope with a rear-end collision.

Additionally, various aspects of the present invention are directed to providing a structure for mounting a battery and a spare tire, in which a vehicle body bracket serves to restrict a position in a left and right direction of the battery when the battery is inserted, and as a result, the number of separate working processes and separate assembling time are not needed.

According to various aspects of the present invention, a structure for mounting a battery and a spare tire may include a battery bracket fixing the battery to an accommodating compartment recessed in a rear floor of a vehicle, and a tire mounting bracket fastened to the spare tire, disposed at an upper side of the battery, through a tire bolt, and fixing the spare tire to the rear floor, in which the battery bracket and the tire mounting bracket are separated so that a load applied to the spare tire is not transmitted to the battery.

Ends of the battery bracket may be coupled to a pair of vehicle body brackets which protrudes in left and right directions of the battery, the tire mounting bracket may be spaced apart from an upper portion of the battery bracket, and ends of the tire mounting bracket may be coupled to the vehicle body brackets separately from the battery bracket.

The structure may further include a front bracket protruding forward from the battery and contacting a front portion of the battery, to restrict forward and rearward movements of the battery.

The structure may further include a mounting portion convexly protruding upward at a central portion of the tire mounting bracket, in which the tire bolt may be coupled to the mounting portion.

A distance in the left and right directions between the vehicle body brackets may be equal to a width in the left and right direction of the battery.

Side surfaces of the vehicle body brackets may have a predetermined inclination angle as a width between the side surfaces is gradually decreased.

The battery bracket may include first battery legs extending in the left and right directions from an upper surface of the battery, and coupled to the pair of vehicle body brackets by bolting, and a second battery leg extending rearward from the upper surface of the battery, and mounted in the accommodating compartment of the rear floor.

The tire mounting bracket may include first tire legs extending in the left and right directions from an upper surface of the battery, and coupled to the pair of vehicle body brackets by bolting, and a second tire leg extending forward from the upper surface of the battery, and mounted in the accommodating compartment of the rear floor.

According to the present invention having the aforementioned configurations, the battery and the spare tire may be mounted regardless of a span of the rear floor, and the battery bracket for fixing the battery and the tire mounting bracket for fixing the spare tire are completely separated from each other, and as a result, at the time of a rear-end collision of a vehicle, the tire bolt is fractured, and the spare tire becomes separated at an early stage.

Therefore, according to the present invention, a load, which is applied to the spare tire by a barrier, is not transmitted to the battery, and as a result, the battery bracket is not damaged even at the time of a rear-end collision of a vehicle, such that the battery is not separated.

According to the present invention, the vehicle body brackets, which are disposed in the left and right directions based on the battery, serve to restrict a position in the left and right direction of the battery when the battery is inserted, and as a result, a position at which the battery is placed is constant, and the number of separate working processes performed by a worker and assembling time are not increased, in comparison with the battery in the related art.

According to the present invention, the front bracket, which is disposed at a front side based on the vehicle body brackets and the battery, blocks moments of force in the left and right direction and the front and rear direction of the battery, and as a result, the battery is not separated.

According to the present invention, the bracket, which has been used to mount a spare tire and a battery in the related art, is omitted, or a size of shape of the bracket is reduced, and as a result, production costs of the vehicle and a weight of a vehicle body are reduced.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
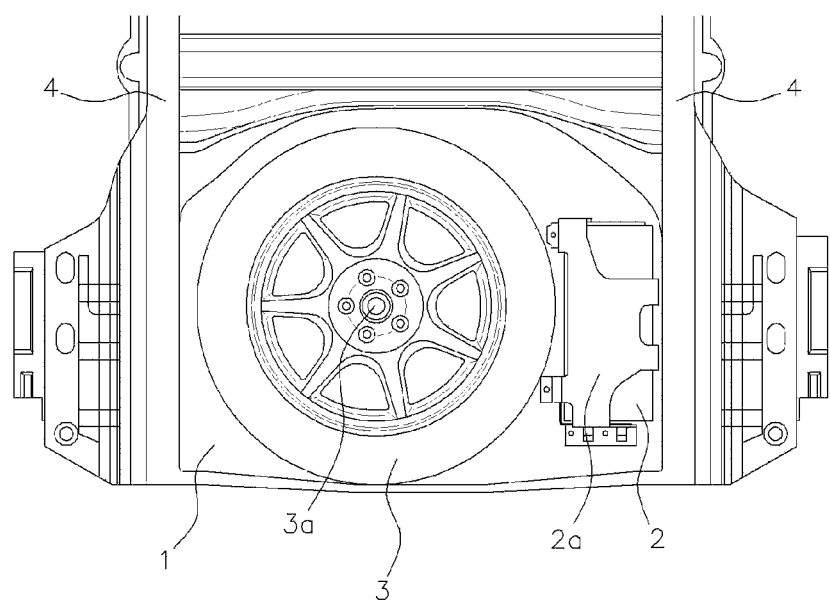
FIG. 1 is a view illustrating a state in which a spare tire and a battery are installed in a left and right direction on a rear floor of a typical vehicle in the related art.
Figure 2:
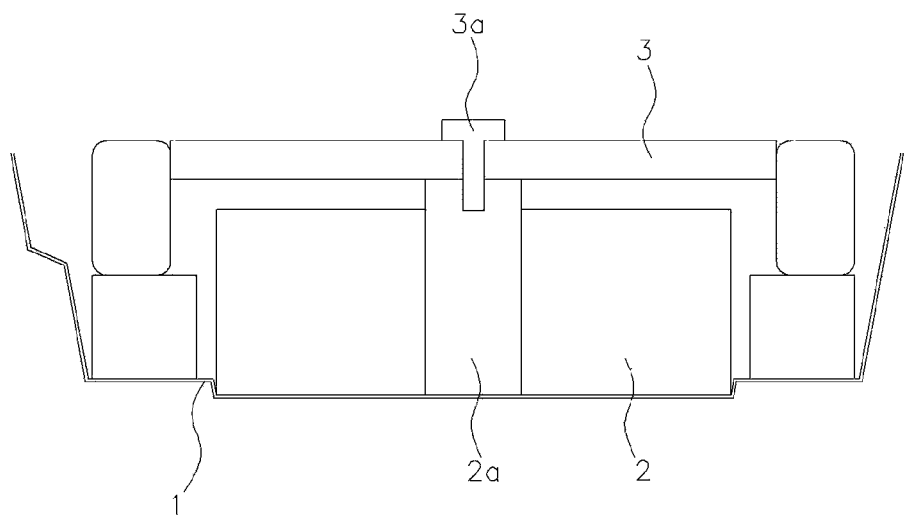
FIG. 2 is a view schematically illustrating a state in which a spare tire and a battery are installed in an up and down direction on a rear floor of a vehicle in the related art.
Figure 3:
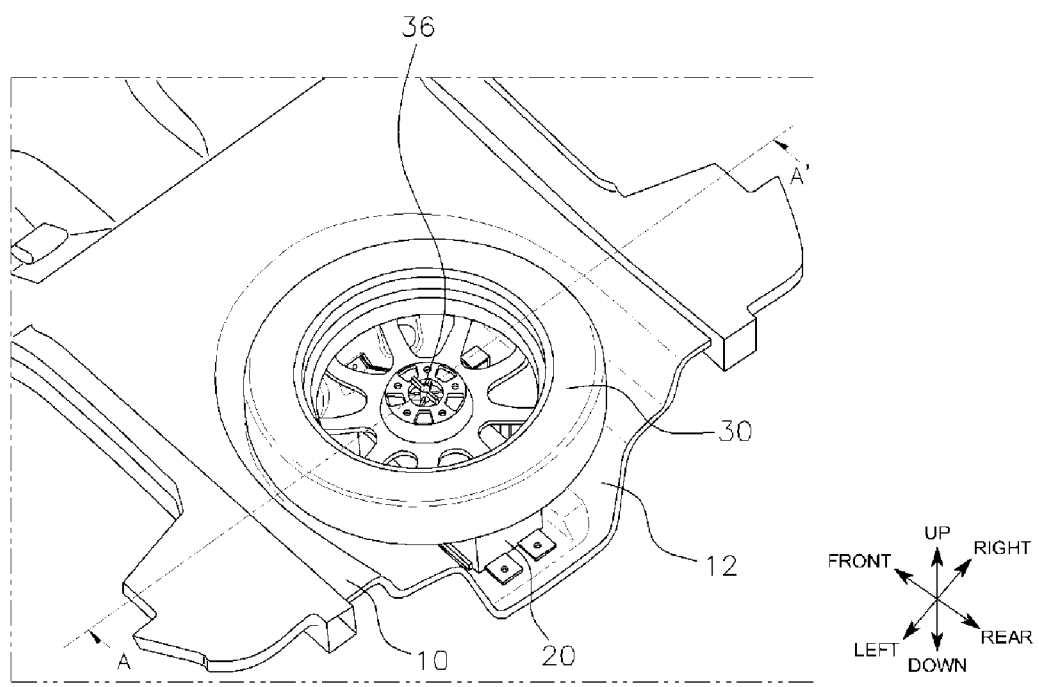
FIG. 3 is a perspective view illustrating an exemplary structure for mounting a battery and a spare tire according to the present invention.
Figure 4:
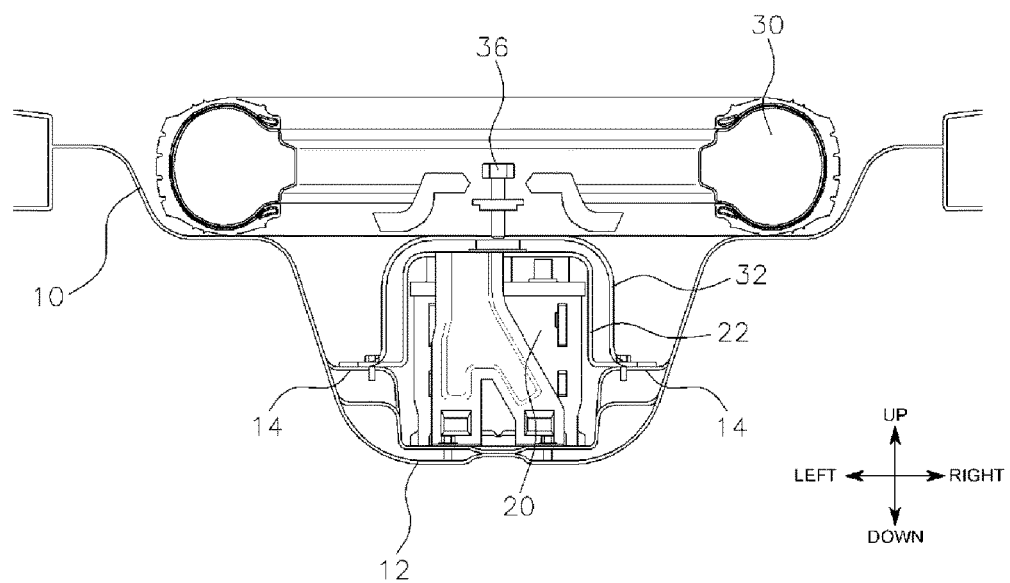
FIG. 4 is a side view illustrating the exemplary structure for mounting the battery and the spare tire according to the present invention.

FIG. 3 is a perspective view illustrating a structure for mounting a battery and a spare tire according to various embodiments of the present invention, and FIG. 4 is a side view illustrating the structure for mounting the battery and the spare tire according to the exemplary embodiment of the present invention.

As illustrated, a battery 20 according to the present invention is accommodated in an accommodating compartment 12 formed to be recessed in a rear floor 10 of a vehicle, and a spare tire 30 is disposed at an upper side of the battery 20 so as to overlap the battery 20.

In comparison with the structure in the related art in which a battery and a spare tire are disposed in a left and right direction, it is not necessary to consider a span of the rear floor 10 in the case of the structure in which the battery 20 and the spare tire 30 are mounted in the up and down (vertical) direction as described above, thereby improving a degree of freedom of a layout.

As illustrated in FIG. 4, the battery 20 is fixedly coupled to the rear floor 10 by a battery bracket 22, and the spare tire 30 is fixedly coupled to the rear floor 10 by a tire mounting bracket 32 through a tire bolt 36.

In this case, because the battery bracket 22 and the tire mounting bracket 32 are completely separated and spaced apart from each other, the battery bracket 22 is not damaged but only the tire bolt 36 of the tire mounting bracket 32 may be fractured at the time of a rear-end collision of a vehicle, such that the spare tire 30 becomes separated at an early stage, and as a result, a load applied to the spare tire is not transmitted to the battery 20.

Figure 5:
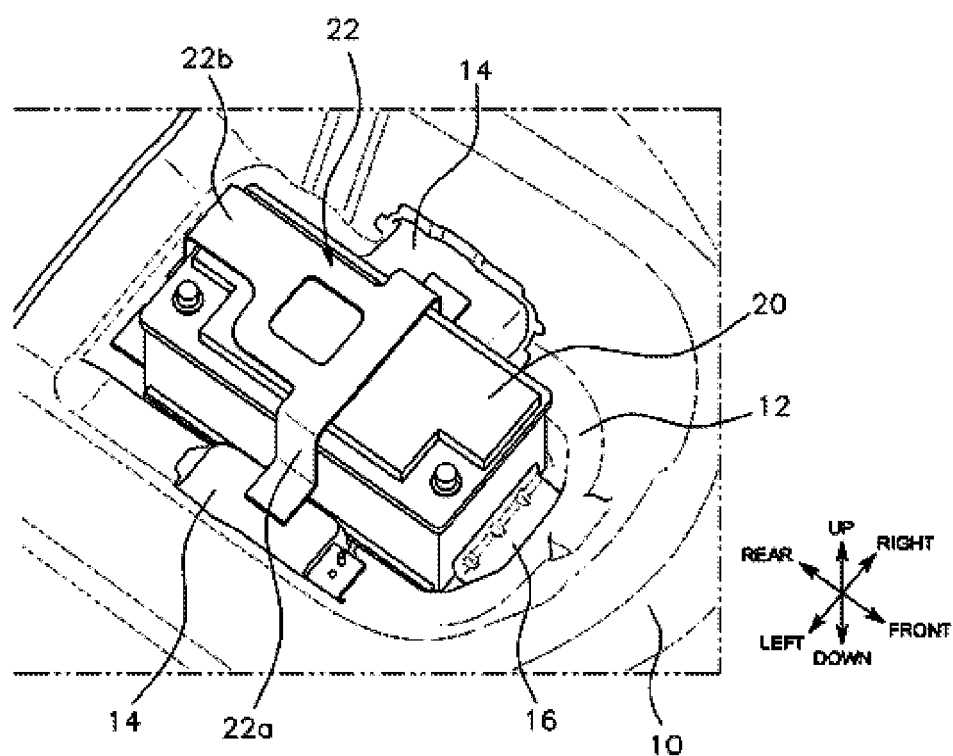
FIG. 5 is a view illustrating a state in which a battery bracket is coupled to the battery according to the present invention.
Figure 6:
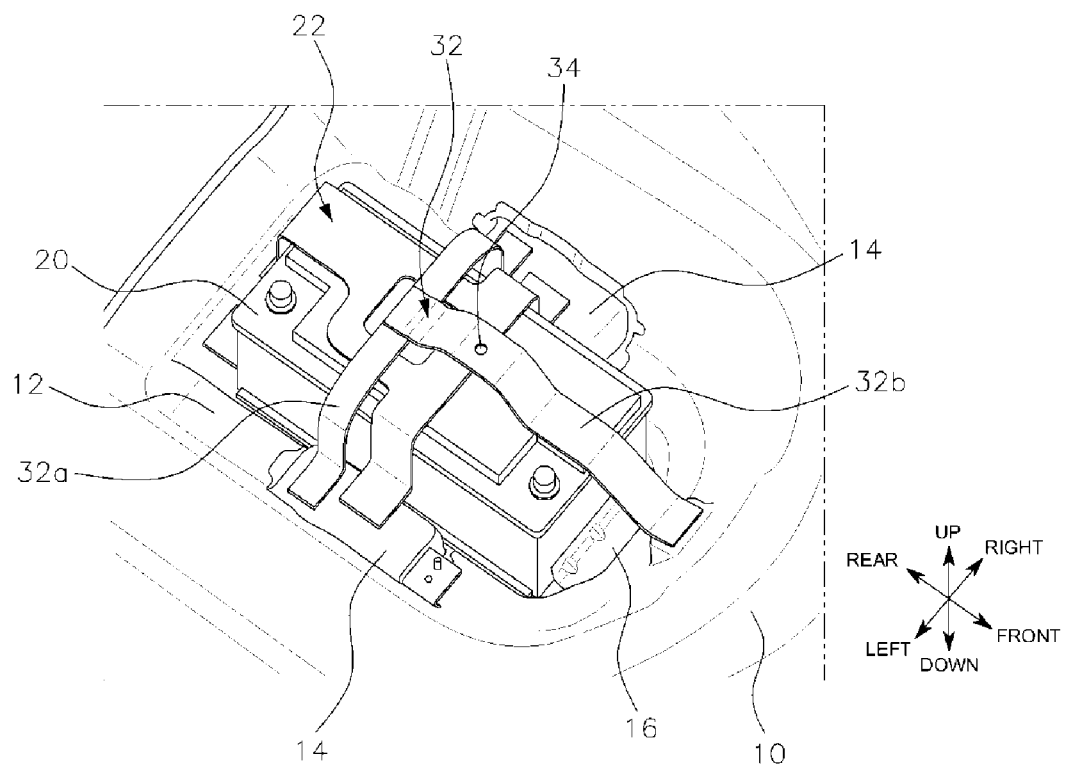
FIG. 6 is a view illustrating a state in which a tire mounting bracket is coupled in a state in which the battery bracket according to the present invention is coupled.

FIG. 5 is a view illustrating a state in which the battery bracket is coupled to the battery according to various embodiments of the present invention, and FIG. 6 is a view illustrating a state in which the tire mounting bracket is coupled in a state in which the battery bracket according to various embodiments of the present invention is coupled.

As illustrated in FIG. 5, ends of the battery bracket 22 are coupled to a pair of vehicle body brackets 14 which protrudes in a left and right direction based on the battery 20, and the battery bracket 22 serves to fix the battery 20.

Specifically, the battery bracket 22 includes first battery legs 22a which extend in the left and right directions from an upper surface of the battery 20 and are coupled to the pair of vehicle body brackets 14 by bolting, and a second battery leg 22b which extends rearward from the upper surface of the battery 20 and is mounted in the accommodating compartment 12 of the rear floor 10.

The battery bracket 22, which includes the first battery legs 22a and the second battery leg 22b, is disposed to surround the upper surface, left and right surfaces, and a rear surface of the battery 20, thereby preventing the battery 20 from being separated from the rear floor 10.

A front bracket 16 protrudes at a front side based on the battery 20, and the front bracket 16 is in contact with a front portion of the battery 20 and serves to restrict forward and rearward movements of the battery.

That is, at the time of a rear-end collision of a vehicle, a moment of force (or load) in the front and rear direction is applied to the battery 20 because of inertia, and in this case, the front bracket 16 resists the moment of force in the front and rear direction, thereby preventing the battery 20 from being lifted up.

As illustrated in FIG. 6, the tire mounting bracket 32 is spaced apart from an upper portion of the battery bracket 22 and installed separately from the battery bracket, and ends of the tire mounting bracket 32 are coupled to the vehicle body brackets 14.

That is, the tire mounting bracket 32 is installed to be separated from the battery bracket 22, and a central portion of the tire mounting bracket 32 is fastened to the spare tire 30 by means of the tire bolt 36, thereby fixing the spare tire.

Specifically, the tire mounting bracket 32 includes first tire legs 32a which extend in left and right directions from the upper surface of the battery 20 and are coupled to the pair of vehicle body brackets 14 by bolting, and a second tire leg 32b which extends forward from the upper surface of the battery 20 and is mounted in the accommodating compartment 12 of the rear floor 10.

In this case, a mounting portion 34 convexly protrudes upward at a central portion of the tire mounting bracket 32, and the tire bolt 36 is coupled to the mounting portion 34 so as to connect the spare tire 30 and the tire mounting bracket 32.

As described above, an installation height of the spare tire 30 may be adapted by forming the mounting portion 34 on the tire mounting bracket 32, and since only the tire bolt 36 is fractured and only the spare tire 30 becomes separated at an early stage at the time of a rear-end collision of a vehicle, a load applied to the spare tire is not transmitted to the battery bracket 22.

Figure 7A:
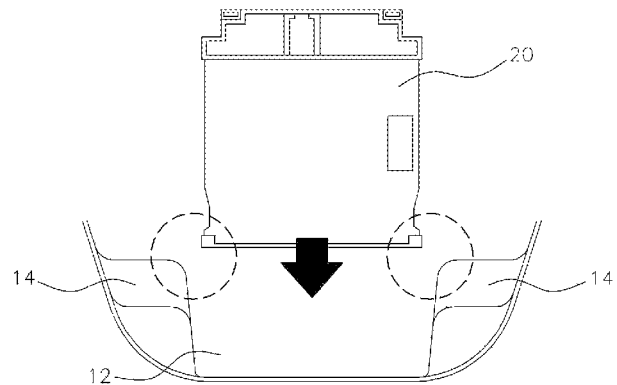
FIG. 7A, FIG. 7B, and FIG. 7C are views illustrating a state in which the battery according to the present invention is placed in an accommodating compartment.
Figure 7B:
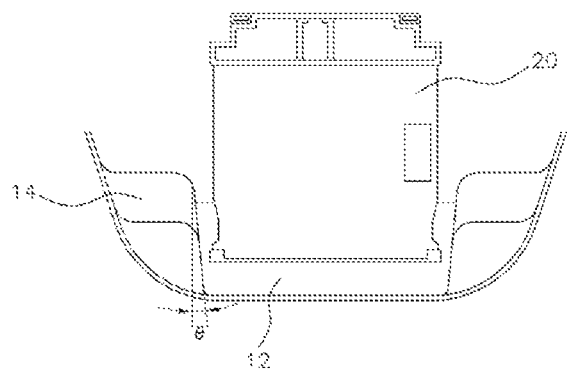
Figure 7C:
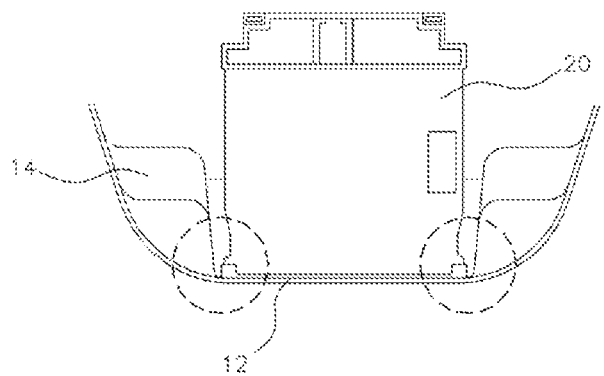

FIG. 7A-FIG. 7C are views illustrating a state in which the battery 20 according to various embodiments of the present invention is placed in the accommodating compartment.

Specifically, FIG. 7A is a view illustrating a state in which the battery 20 is being inserted into the accommodating compartment 12 from an upper side of the accommodating compartment 12 by a machine (not illustrated), FIG. 7B is a view illustrating a state in which the battery 20 is being moved to a lower portion of the accommodating compartment 12 after being inserted, and FIG. 7C is a view illustrating a state after the battery 20 is completely placed.

As illustrated by dotted circles in FIG. 7A, a space of about 10 mm is formed between the battery 20 and the vehicle body bracket 14 by considering a likelihood that the battery 20 is not inserted into an accurate position due to an error of the machine (not illustrated) when the battery 20 is inserted into the accommodating compartment 12 from the upper side of the accommodating compartment 12 by the machine.

Next, as illustrated in FIG. 7B, the inserted battery 20 is moved downward to the lower portion of the accommodating compartment 12 along the side surfaces of the vehicle body brackets 14, and the side surfaces of the vehicle body brackets 14 may have a predetermined inclination angle $\theta$ as a width between the side surfaces is gradually decreased downward, thereby guiding the battery 20 so that the battery 20 is positioned at an accurate position.

The inclination angle $\theta$ formed at the side surfaces of the vehicle body brackets 14 may be set to various angles in consideration of a layout depending on the type of vehicle, a size of the battery, and a size of the accommodating compartment, and in the exemplary embodiment of the present invention, the inclination angle $\theta$ may be, but not limited to, about 5°.

As illustrated by dotted circles in FIG. 7C, the battery 20, which has been moved downward along the side surfaces of the vehicle body brackets 14, is accurately placed on the lower portion of the accommodating compartment 12, and in this case, a distance in the left and right direction between the vehicle body brackets 14 may be equal to or slightly larger than a width in the left and right direction of the battery 20.

In various embodiments of the present invention, a spacing between the battery 20 and the vehicle body bracket 14 may be within about 2 mm, but the spacing may be variably set in consideration of a layout depending on the type of vehicle, a size of the battery, and a size of the accommodating compartment.

The structure for mounting the battery and the spare tire according to the present invention, which is configured as described above, may mount the battery 20 and the spare tire 30 regardless of a span of the rear floor 10, the battery bracket 22 is not damaged even at the time of a rear-end collision of a vehicle such that the battery 20 is not separated, and the vehicle body brackets 14 serve to restrict the position in the left and right direction of the battery 20 when the battery 20 is inserted, and as a result, in comparison with the battery in the related art, a position at which the battery 20 is placed is constant, and the number of separate working processes performed by a worker and assembling time are not increased.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A structure for mounting a battery and a spare tire, the structure comprising:
   a battery bracket fixing the battery to an accommodating compartment recessed in a rear floor of a vehicle; and
   a tire mounting bracket fastened to the spare tire, disposed at an upper side of the battery, through a tire bolt, and fixing the spare tire to the rear floor,
   wherein the battery bracket and the tire mounting bracket are separated so that a load applied to the spare tire is not transmitted to the battery, wherein ends of the battery bracket are coupled to a pair of vehicle body brackets which protrudes in left and right directions of the battery, the tire mounting bracket is spaced apart from an upper portion of the battery bracket, and ends of the tire mounting bracket are coupled to the vehicle body brackets separately from the battery bracket, and wherein the battery bracket includes:
- first battery legs extending in the left and right directions from an upper surface of the battery, and coupled to the pair of vehicle body brackets by bolting; and
- a second battery leg extending rearward from the upper surface of the battery, and mounted in the accommodating compartment of the rear floor.

2. The structure of claim 1, further comprising a front bracket protruding forward from the battery and contacting a front portion of the battery, to restrict forward and rearward movements of the battery.

3. The structure of claim 1, further comprising a mounting portion convexly protruding upward at a central portion of the tire mounting bracket, wherein the tire bolt is coupled to the mounting portion.

4. The structure of claim 1, wherein a distance in the left and right directions between the vehicle body brackets is equal to a width in the left and right direction of the battery.

5. The structure of claim 1, wherein side surfaces of the vehicle body brackets have a predetermined inclination angle such that a distance formed between the side surfaces is gradually narrowed.

6. The structure of claim 1, wherein the tire mounting bracket comprises:
- first tire legs extending in the left and right directions from an upper surface of the battery, and coupled to the pair of vehicle body brackets by bolting; and
- a second tire leg extending forward from the upper surface of the battery, and mounted in the accommodating compartment of the rear floor.

* * * * *